Sept. 8, 1953
G. DE MESTRAL
2,651,201
MEASURING INSTRUMENT FOR DETERMINING
THE HUMIDITY OF GASEOUS MIXTURES
Filed March 22, 1951
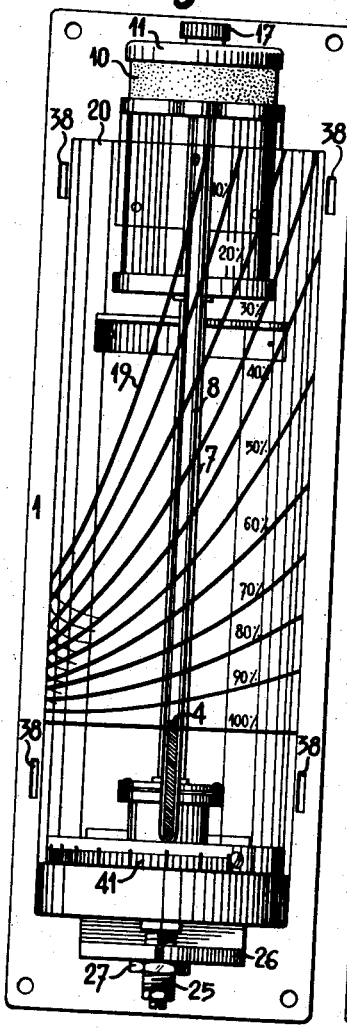
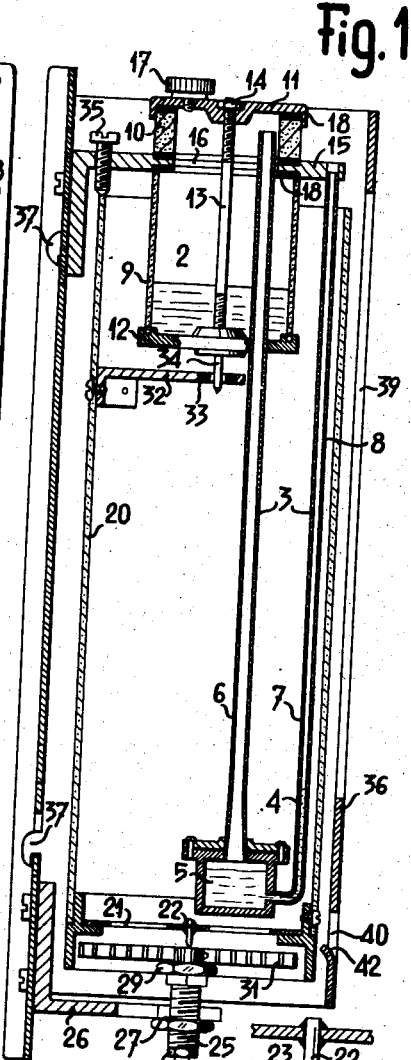
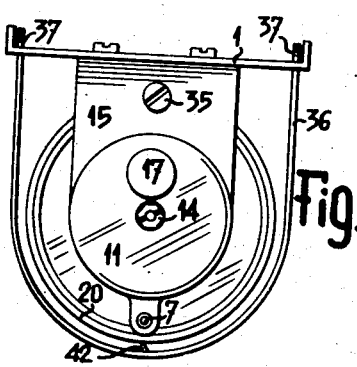
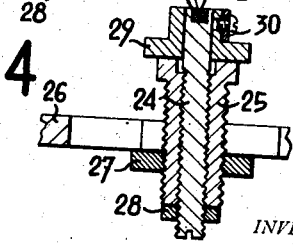
INVENTOR.
GEORGE DE MESTRAL
BY *Fritz C. Hachwald*
AGENT Patented Sept. 8, 1953

2,651,201

UNITED STATES PATENT OFFICE 2,651,201

MEASURING INSTRUMENT FOR DETERMINING THE HUMIDITY OF GASEOUS MIXTURES

George de Mestral, Prangins, Switzerland, assignor to Tesa S. A., Renens, Switzerland Application March 22, 1951, Serial No. 217,011
In Switzerland December 12, 1950

9 Claims. (Cl. 73—335)

1

The invention relates to measuring instruments for determining the humidity of a gaseous mixture.

Such instruments are based on the principle of gas diffusion through a porous wall and are equipped with a manometer for measuring the pressure difference between the pressure existing in a chamber which is provided with a porous wall and contains either saturated water vapor or a drying substance, and the pressure of the gaseous fluid in which the degree of humidity is to be determined.

The known instruments of this type have the drawback that for determining the relative humidity of said gaseous fluid it is necessary to plot the overpressure indicated by the manometer on a transformation chart and to determine from such chart the percentage of relative humidity by taking in consideration the temperature of the gaseous fluid.

A principal object of the invention is to provide a direct reading measuring instrument for determining the humidity of a gaseous mixture.

Other objects and advantages will be apparent from a consideration of the specification and claims.

According to the invention, the direct reading of the degree of relative humidity of a gaseous fluid for any pressure indicated by the manometer is made possible by an arrangement comprising a mobile transformation chart which automatically corrects, in function of the temperture, the indications given by the manometer. In view of this automatic adjustment, it is no longer necessary to use the indirect reading with plotting of the indicated pressures on the transformation chart, as the operation is automatically performed by correcting means.

The invention will be readily understood from the following description in connection with the accompanying drawings which show, by way of example, an embodiment of the invention. In the drawings:

Fig. 1 is a cross sectional view of a measuring instrument for determining the humidity of a gaseous mixture according to the invention;

Fig. 2 is a front view of the instrument; and

Fig. 3 is a plan view, a protecting metal sheet being removed,

Fig. 4 is a detail cross sectional view.

The instrument comprises a plate 1 forming the support for an evaporation chamber 2 provided with a wall which is, in part, porous. The chamber 2 contains a certain amount of distilled water and the space above the water level is,

2 therefore, filled with water vapor in a nearly saturated state. A manometer 3 is connected with said chamber 2 and measures the difference between the pressure inside said chamber 2 and the surrounding atmosphere. The manometer consists of a tube 3 which is bent in U form and contains an indicator liquid 4. An expansion chamber 5 is provided at the bend of the manometer. In this way, a small pressure difference between the inside of the chamber 2 and the outside is sufficient to produce an appreciable difference of the level of the indicator liquid 4 in the two legs of the manometer 3. In view of the large volume of the liquid 4 contained in the expansion chamber 5, the level of the liquid in said chamber will vary only very little with respect to the level of the liquid contained in the other leg 7 of the manometer 3.

In the represented embodiment, the leg 6 of the tube of the manometer 3 which is connected to the chamber 2 opens into the expansion chamber 5 with an inside diameter larger than that of the pressure indicating tube 7 in order to avoid that a drop of the indicator fluid 4 at the mouth of said tube 6 forms a plug capable of altering the indications of the manometer 3.

In order to render the manometer 3 less sensitive to shocks during transportation of the instrument, the tube 6 and the expansion chamber 5 are made of metal and the tube 7 only is made of glass. In addition, this glass tube 7 presents a flat surface 8 in order to avoid that a lens effect should be produced by the curvature of tube 7 and should cause the liquid indicator column 4 appearing thicker than it is in reality. This flat surface 8 can be obtained by polishing the glass tube 7.

The chamber 2 is composed of a cylindrical transparent element 9, made for instance of a plastic material, of a ring 10 of porous material and of a disc 11 which forms the lid. These three pieces 9, 10 and 11 are secured together by means of a bolt of which the head 12 forms the base of the chamber 2 whereas its threaded end 13 passes through the three pieces 9, 10 and 11. The nut 14 of the bolt is tightened against a recess of the disc 11.

This chamber 3 is supported by a bracket 15 fixed to the plate 1 and presenting a hole 16 having a diameter approximately equal to the bore of the disc 10.

The lid 11 presents an opening permitting the introduction of distilled water in the chamber 2. This opening is closed by a plug 17.

Washers 18 are provided between the porous ring 10 and the adjacent pieces 15 and 11, between the part 15 and the part 9 and between the nut 14 and the disc 11.

The transformation chart 19 is represented on a transparent cylinder 20 of so called plastic material which pivots on its axis by an angle which is a function of the temperature.

Said cylinder 20 is provided with a bottom 21 at the centre of which is fixed a pivot 22.

This pivot (see Fig. 4) rests on a bearing 23 set at the end of a rod 24 which is threaded and is screwed into a socket 25, internally and externally threaded, so as to be capable of being adjusted in relation to a bracket 26. A nut 27 tightens the socket 25 in the bracket 26 and another nut 28 tightens the rod 24 in the socket 25.

On the upper part of the rod 21 is placed a tubular part 29 to which is fixed, by a screw 30, the inside of a bimetallic coil 31. The other end of this coil 31 is fastened to the cylinder 20, so as to make it pivot on its axis by an angle which is a function of the temperature.

A stay 32 is fixed to the upper part of the cylinder 20. It carries a bearing 33 in which is engaged the end of a rod 34 fastened to the part 12 of the chamber 2.

Means are provided to fasten the cylinder 20 during the transport of the instrument. These means consist of a screw 35, screwed into a bracket 15, so that the tip of the screw presses against the edge of the cylinder 20.

A protective metal sheet 36 (which is supposed to have been removed in Fig. 2) is fixed to the plate 1 by hooks 37 engaged in slits 38 of the plate 1. This metal sheet 36 presents a main window 39 through which appears the chart 19 and, behind it, the tube 7 of the manometer. A second window 40 is cut at the lower part of the metal sheet 36. Through this window appears a thermometric graduation 41 marked on the lower part of the tube 20. The surrounding temperature is read in front on an index 42 formed by a bent part of the protective metal sheet 36.

In order to render more visible the indicator liquid column 4, a screen of light colour can be provided behind said column. For instance, one can form this screen by giving a coat of light paint to the part of the tube 7 opposite to that presenting the flat surface 8.

Owing to the presence of the bimetallic coil 31 between the cylinder 20 and the plate 1, the chart 19 carried by the cylinder 20 is automatically displaced by amounts which are functions of the temperature, under the action of the bimetallic coil 31, and it becomes possible to read directly the degree of relative humidity of the surrounding gaseous fluid by determining on said chart 19 the point of coincidence or intersection of the level 7 of the manometer 3 with the curve of the percentage humidity.

In order to avoid spilling the indicator liquid 4 from the manometer 3, for instance during transportation of the instrument, it is desirable to place a plug at the end of the tube 7 of the manometer. This plug has, of course, to be removed when the instrument is used for measurements.

In the above described instrument for measuring the humidity, the atmosphere of the chamber 2 was always considered as being saturated with humidity. Now, it is clearly understood that all these instruments could operate in a similar manner by replacing the atmosphere saturated with humidity of chamber 2 by a dry atmosphere. It would be sufficient, indeed, to replace the distilled water contained in the bottom of chamber 2 by any drying substance absorbing all humidity likely to enter chamber 2. In this case, the manometer indications would be the reverse of those of the instrument represented on the drawing. Indeed, in the latter, when the humidity degree of the surrounding atmosphere is 100%, the pressures inside and outside chamber 2 are even and the indicator liquid 4 is at its lowest level in tube 7. The contrary takes place when the instrument contains some drying substance. Indeed, at such a moment, when the humidity degree of the surrounding atmosphere is 100%, the difference of pressure between the inside and the outside of the chamber 2 is the greatest and the indicator liquid 4 reaches the highest level in tube 7. It would thus be necessary, in this last case, to reverse the curves of chart 19, so that immediate reading of the humidity degree could take place.

Moreover, in an instrument intended for use with drying substance, the expansion chamber 5, instead of being provided at the bend of the manometer, should be provided at the upper part of the tube 6.

Instruments such as described present real advantages over humidity measuring instruments of known type, as they no longer require any manipulation and enable to determine by a single reading the relative degree of humidity of the surrounding gaseous fluids.

It is indeed all important that the bimetallic coil 31 should not be bathed by water vapor coming from the instrument itself and thereby altering the measure of the degree of humidity of the surrounding atmosphere.

Finally, the porous part of the walls of the chamber 2 can advantageously be made of graphite or of china.

I claim:

1. A measuring instrument for determining the humidity of a gaseous mixture comprising a transparent cylinder mounted for pivotal movement, a chart on said cylinder, a diffusion chamber at least partially located inside the upper end of said cylinder for receiving a liquid to produce a saturated atmosphere of said liquid in said chamber, said diffusion chamber having at least in part porous walls, a U-tube manometer substantially inside said cylinder, one leg of said manometer opening into said diffusion chamber above the level of the liquid, the other leg serving as pressure indicating tube and being positioned behind said chart, and temperature responsive means pivoting said cylinder and chart at an angle which is a function of the temperature of the surrounding gas.

2. A measuring instrument as claimed in claim 1 wherein the pressure indicating leg of the manometer tube has a flattened surface.

3. A measuring instrument for determining the humidity of a gaseous mixture as defined in claim 1, wherein the diffusion chamber comprises a cylindrical tube, a ring made of porous material, and a disc forming the top of the chamber, said tube, ring and disc screwed tightly together by a threaded bolt of which the head forms the bottom of the chamber and of which the threaded end passes through said disc for receiving a nut.

4. A measuring instrument for determining the humidity of a gaseous mixture as defined in claim 1 wherein the porous wall of said diffusion chamber is made of graphite.

5. A measuring instrument for determining the humidity of a gaseous mixture comprising a transparent cylinder mounted for pivotal movement, a chart on said cylinder, a diffusion chamber at least partially located inside the upper end of said cylinder for receiving a liquid to produce a saturated atmosphere of said liquid in said chamber, said diffusion chamber having at least in part porous walls, a U-tube manometer substantially inside said cylinder, one leg of said manometer opening into said diffusion chamber above the level of the liquid and being provided with an expansion chamber, the other leg serving as pressure indicating tube and being positioned behind said chart, and temperature responsive bimetallic means pivoting said cylinder and chart at an angle which is a function of the temperature of the surrounding gas.

6. A measuring instrument as claimed in claim 5, wherein the leg of the manometer connected with the diffusion chamber has a larger inner diameter than the pressure indicating leg and is made of metal.

7. A measuring instrument for determining the humidity of a gaseous mixture comprising a housing, a transparent cylinder mounted inside said housing for pivotal movement, a chart on said cylinder, an opening in the front wall of said housing exposing said chart, a diffusion chamber located substantially inside the upper end of said cylinder for receiving a liquid to produce a saturated atmosphere of said liquid in said chamber, said diffusion chamber having at least in part porous walls, means supporting said chamber, a U-tube manometer located substantially inside said cylinder, one leg of said manometer opening into said diffusion chamber above the level of the liquid and being provided with an expansion chamber, the other leg of said manometer serving as pressure indicating tube and being positioned behind said chart, a bottom plate at the lower end of said cylinder, a pivot at the center of said bottom plate, a temperature responsive bimetallic member, one end of said member being secured to said cylinder, and supporting means secured to said housing, said supporting means carrying said pivot of the cylinder and the other end of said bimetallic member.

8. A measuring instrument as claimed in claim 7, wherein the temperature responsive bimetallic member has the form of a helical leaf spring.

9. A measuring instrument as claimed in claim 7 wherein a thermometric scale is carried by the cylinder and a second opening is provided in the front wall of the housing to expose said scale.

GEORGE DE MESTRAL.

References Cited in the file of this patent
UNITED STATES PATENTS

| Number | Name | Date |
|---|---|---|
| 2,143,775 | Hertel | Jan. 10, 1939 |
| 2,143,795 | Okey | Jan. 10, 1939 |
| 2,185,104 | Heller | Dec. 26, 1939 |
| 2,225,608 | Brown et al. | Dec. 24, 1940 |
| 2,265,767 | Alder | Dec. 9, 1941 |
| 2,438,330 | Winton | Mar. 23, 1948 |